United States Patent [19]
Hardy

[11] 3,778,837
[45] Dec. 11, 1973

[54] PRECISION CALIBRATION TARGET FOR RADIOMETERS

[75] Inventor: Walter N. Hardy, Vancouver, B. C., Canada

[73] Assignee: Rockwell International Corporation, El Segundo, Calif.

[22] Filed: Aug. 17, 1972

[21] Appl. No.: 281,583

[52] U.S. Cl. .................. 343/703, 73/1 F, 343/18 A
[51] Int. Cl. ............................................... G01s 7/40
[58] Field of Search ............. 73/1 F, 432 SD, 1.5; 343/703, 100 ME, 18 A

[56] References Cited
UNITED STATES PATENTS

| | | | |
|---|---|---|---|
| 3,287,956 | 11/1966 | Dreyfus et al. | 74/432 SD |
| 3,498,132 | 3/1970 | Smith et al. | 343/100 ME |
| 2,490,782 | 12/1949 | Collup | 343/703 |
| 2,846,647 | 8/1958 | MacPherson | 333/22 F |

OTHER PUBLICATIONS

Dicke, The Measurement of Thermal Radiation at Microwave Frequencies: The Review of Scientific Instruments, Vol. 17, No. 7, July 1946.

Primary Examiner—Eli Lieberman
Attorney—L. Lee Humphries et al.

[57] ABSTRACT

A radiometer reference target comprising a porous mass of microwave absorbing material having lateral dimensions substantially equal to those of the antenna horn of the radiometer to be calibrated having one surface facing said horn configured to minimize microwave radiation, a quantity of fluid whose temperature is accurately known saturating said porous mass, a cap of non-porous microwave transparent material covering said one surface of said porous mass and having one surface configured to mate with and disposed in contiguous relation with said one surface of said porous mass, and shield of microwave reflective material disposed about the other surfaces of said porous mass to retain said fluid within said porous mass. Both method and apparatus are disclosed.

3 Claims, 2 Drawing Figures

PATENTED DEC 11 1973    3,778,837

PRECISION CALIBRATION TARGET FOR RADIOMETERS

BACKGROUND FIELD OF THE INVENTION

This invention relates to radiometry and is particularly directed to improved temperature references for calibrating radiometers and the like.

PRIOR ART

As is well known, all objects emit thermal radiation which is indicative of the temperature of the object. Accordingly, microwave radiometers have been developed for detecting such radiation to permit determination of the temperature of remote target objects. Thus, for example, radiometers may be mounted in aircraft or orbital vehicles to measure the temperature of the oceans of the earth to facilitate ecological studies and the like. Unfortunately, radiometers usually provide only relative measurements. Consequently, when it is desired to determine the absolute temperature of a target object, it is customary to calibrate the radiometer by replacing the antenna with a cooled reference termination and then applying corrections for the ohmic and reflective losses of the antenna and connecting parts. The uncertainties in the required corrections limit the precision of the measurements and, for many application, are unacceptably large. An alternative method is to point the antenna at a reference target of known temperature. With this calibration technique, the precision of the radiometer is limited by the accuracy with which the temperature of the reference target is known, the microwave reflectivity of the reference target, and the extent to which the reference target encompasses the full view of the radiometer. Although cooled targets have been used in the past, none have been suitable for high precision radiometry. Prior devices have had either a poorly defined physical temperature of the microwave absorber or high microwave reflectivity, or both, and as a consequence there was considerable uncertainty in the microwave radiometric temperature.

BRIEF SUMMARY AND OBJECTS OF INVENTION

These disadvantages of the prior art are overcome with the present invention and a reference target is provided which is thermally stable and whose temperature can be determined with high precision. Moreover, the reference target of the present invention is virtually nonreflective of microwaves, is readily transported and completely fills the view of the radiometer antenna.

The advantages of the present invention are preferably attained by providing a reference target comprising a porous mass of microwave absorbing material having lateral dimensions substantially equal to those of the horn of the radiometer antenna and having irregular surface, a quantity of coolant fluid whose temperature is accureately known saturating said porous mass, a cap of nonporous microwave transparent material of low dielectric constant covering said irregular surface of said porous mass and having one surface of said cap in contiguous mating relation with said irregular surface, and a shield of microwave reflective material disposed about the other surfaces of said porous mass to retain said fluid within said porous mass.

Accordingly, it is an object of the present invention to provide an improved reference target for calibrating radiometers.

Another object of the present invention is to provide a radiometer reference target having uniform, stable temperature characteristics.

A further object of the present invention is to provide a radiometer reference target whose temperature may be determined with high precision.

An additional object of the present invention is to provide a radiometer reference target which does not reflect radiation at the microwave frequencies of interest.

A specific object of the present invention is to provide a radiometer reference target comprising a porous mass of microwave absorbing material having lateral dimensions substantially equal to those of the horn of the radiometer antenna and having an irregular surface, a quantity of coolant fluid whose temperature is known accurately saturating said porous mass, a cap of nonporous microwave transparent material of low microwave reflectivity covering said irregular surface and having one surface of said cap in contiguous mating relation with said irregular surface, and a shield of microwave reflective material disposed about the other surfaces of said porous mass to retain said fluid within said porous mass.

These and other objects and features of the present invention will be apparent from the following detailed description, taken with reference to the accompanying drawing.

DETAILED DESCRIPTION OF ILLUSTRATED EMBODIMENT

Figure 1:
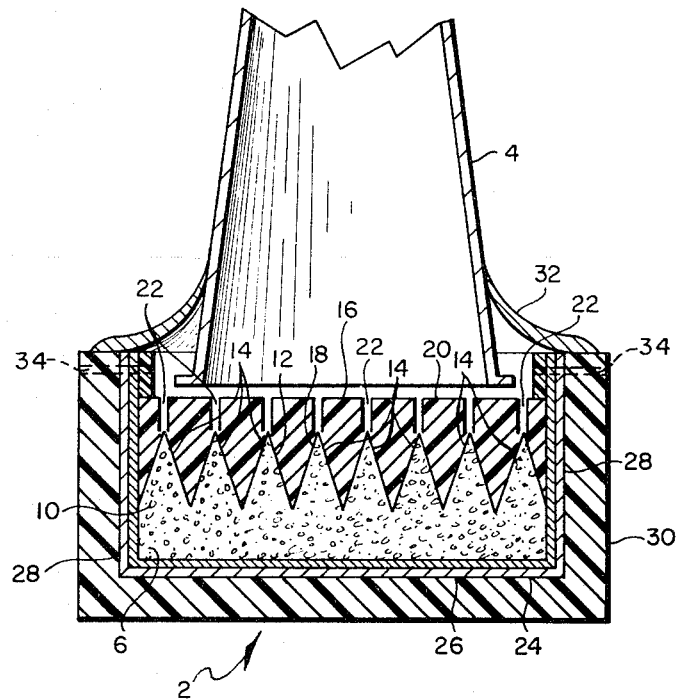
FIG. 1 is a vertical section through a radiometer reference target embodying the present invention.
Figure 2:
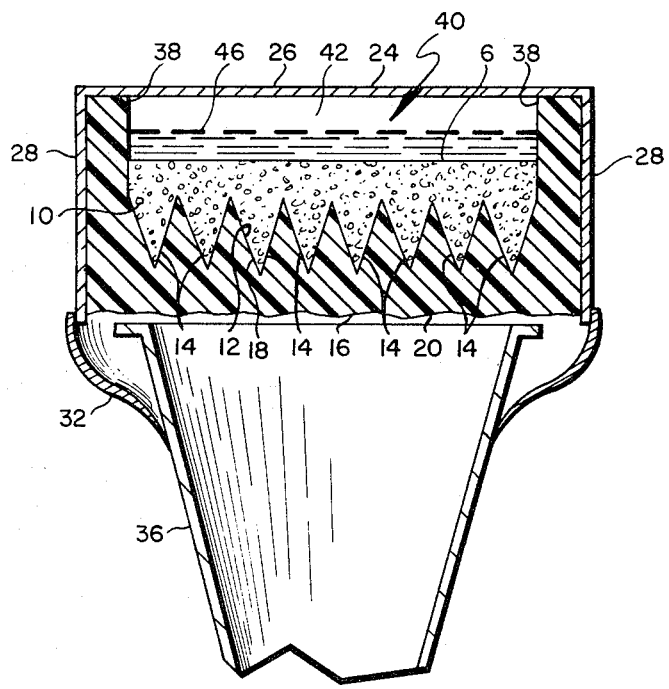
FIG. 2 is a vertical section through an alternative form of the reference target of FIG. 1.

In that form of the present invention chosen for purposes of illustration in FIG. 1, a radiometer reference target, indicated generally at 2, is shown mounted on the horn 4 of a radiometer, not shown. The target 2 comprises a mass 6 of porous, microwave absorbing material, such as a polyurethane foam containing powdered carbon, available commercially under the tradename "SPY," from Emerson and Cummins, Inc., Gardena, Calif., which is saturated with a suitable coolant fluid 10 such as liquid nitrogen or argon. The porous mass 6 is formed with an irregular surface 12 having a plurality of pyramidal or otherwise configured projections 14 protruding therefrom to minimize reflection of microwaves toward the antenna horn 4. The irregular surface 12 of the porous mass 6 is disposed in facing relation with the antenna horn 4 and is covered with a cap 16 of nonporous material, such as expanded polyurethane foam, which is essentially transparent to microwaves and which has a low dielectric constant and consequent low reflectivity. The cap 16 has one surface 18 configured to mate with the irregular surface 12 of the porous mass 6 and disposed in contiguous relations therewith so as to minimize or eliminate any dielectric discontinuity between the cap 16, the porous mass 6 and the fluid 10 contained in the porous mass 6. Because the cap 16 is composed of low dielectric constant material, there will be very little reflection from the opposite surface 20 of the cap 16. However, if desired, the surface 20 may be irregularly configured to further minimize reflections therefrom as seen in FIG. 2. To assure complete saturation of the porous mass 6 by the coolant fluid 10, a plurality of vent holes 22 may be provided extending through the cap 16 and each communicating with the apex of a respective one of the projections 14 of the porous mass 6. This also assures that the temperature at the apexes of the projections 14 will be at the boiling point, of the coolant fluid 10 and, hence, will present a uniform temperature across the target 2. The porous mass 6 and cap 16 are disposed within a container 24 formed of microwave reflective material, such as metal, and having a bottom 26 and side walls 28 and being open adjacent surface 20 of the cap 16. The exterior of the container 24 is covered with a layer 30 of thermal insulating material, such as styrofoam and an annular shield 32, formed of aluminum or the like, is provided to mount the target 2 on the antenna horn 4 and to shield our extraneous radiation. If desired, vent holes 34 may be provided extending through the side walls 28 of container 24 and the insulating layer 30, to permit evaporative vapor from the fluid 10 to escape.

In use, the porous mass 6 is saturated with coolant fluid 10 and the target 2 is mounted to cover the antenna horn 4 of the radiometer in the manner illustrated in FIG. 1. Thereafter, the radiometer may be calibrated in a conventional manner. Because the cap 16 is transparent to microwaves and the porous microwave absorbing mass 6 is permeated with the coolant fluid 10, the effective radiometric temperature is that of the coolant fluid 10, whose temperature can be accurately determined by conventional techniques. Furthermore the nonporous foam cap 16, although transparent at microwave frequencies will have considerable absorption at infrared frequencies where the great bulk of thermal radiation is concentrated; since its temperature is nominally that of the coolant 10, said cap 16 serves as a very effective infrared radiation trap and minimizes any surface heating of mass 6 by thermal radiation. The container 24 and cap 16 serve to retain the coolant fluid 10 within the porous mass 6 and the container 24 also serves in cooperation with the shield 32 to prevent extraneous microwaves from entering the antenna horn 4. As indicated above, the surface 12 of the porous mass 6 is configured to minimize microwave reflection and surface 18 of the cap 16 is formed to mate and is mounted contiguous with the surface 12 to force the coolant fluid 10 to conform to the shape of porous mass 6 in order to minimize microwave reflections. Consequently, the radiometer will receive substantially only microwaves resulting from thermal emission within the porous microwave absorber and can be calibrated with a precision which has not been obtainable heretofore.

FIG. 2 illustrates an alternative form of the reference target of FIG. 1 for use with upwardly directed antenna horns 36. In this form of the invention, the cap 16 is formed with upwardly extending annular walls 38 defining a central recess 40 within which is mounted the porous mass 6 and the container 24 is inverted so that the "bottom" 26 overlies and serves as a cover and shield for the recess 40. Obviously, in this form of the invention, the vent holes 22 must be omitted from the cap 16. Preferably, the depth of the recess 40 is somewhat greater than that of the porous mass 6 so as to provide a space 42 to accommodate evaporative vapor from the coolant fluid 10 and a vent 44 is provided extending through the walls 38 of the cap 16 and walls 38 of the container 24 to permit the vapor to escape. Also, if desired, the quantity of the coolant fluid 10 may be made sufficient to provide a layer of the fluid above the porous mass 6, as seen at 46. Furthermore, if desired, a channel 48 can be formed in the cap 16 communicating with the apex of each of the projections 14 and with vertical vents 50 to assure complete saturation of the porous mass 6. In use, this form of the invention performs substantially identically to that of FIG. 1.

Obviously, numerous other variations and modifications may be made without departing from the present invention. Accordingly, it should be clearly understood that the forms of the present invention described above and shown in the accompanying drawing are illustrative only and are not intended to limit the scope of the invention.

What is claimed is:

1. A radiometer reference target comprising:
   a porous mass of microwave absorbing material having one surface configured to minimize reflection of microwaves,
   a cap formed of nonporous microwave transparent material covering said one surface of said porous mass and having a surface configured to mate with and disposed in contiguous relation with said one surface of said porous mass,
   a quantity of a liquid gas having known thermal characteristics and at a cryogenic temperature saturating said porous mass, and
   a shield formed of microwave reflective material disposed about the other surfaces of said porous mass and serving to retain said fluid within said porous mass.

2. The device of claim 1 wherein said one surface of said porous mass is formed with a plurality of pyramidal projections protruding therefrom, and
   a plurality of vent holes are provided extending through said cap and each communicating with the apex of a respective one of said projections.

3. A radiometer reference target comprising:
   a porous mass of radiation absorbing material having one surface configured to minimize reflection of said radiation,
   a quantity of fluid saturating said porous mass,
   a nonporous cap or radiation transparent material covering said one surface of said porous mass and having a surface configured to mate with and disposed in contiguous relation with said one surface of said porous mass, and
   a shield of radiation reflective material disposed about the other surface of said porous mass.

* * * * *